Feb. 27, 1962 G. ALFIERI 3,023,052
BRAKING EQUIPMENT FOR COMPOSITE VEHICLES
Filed July 11, 1958
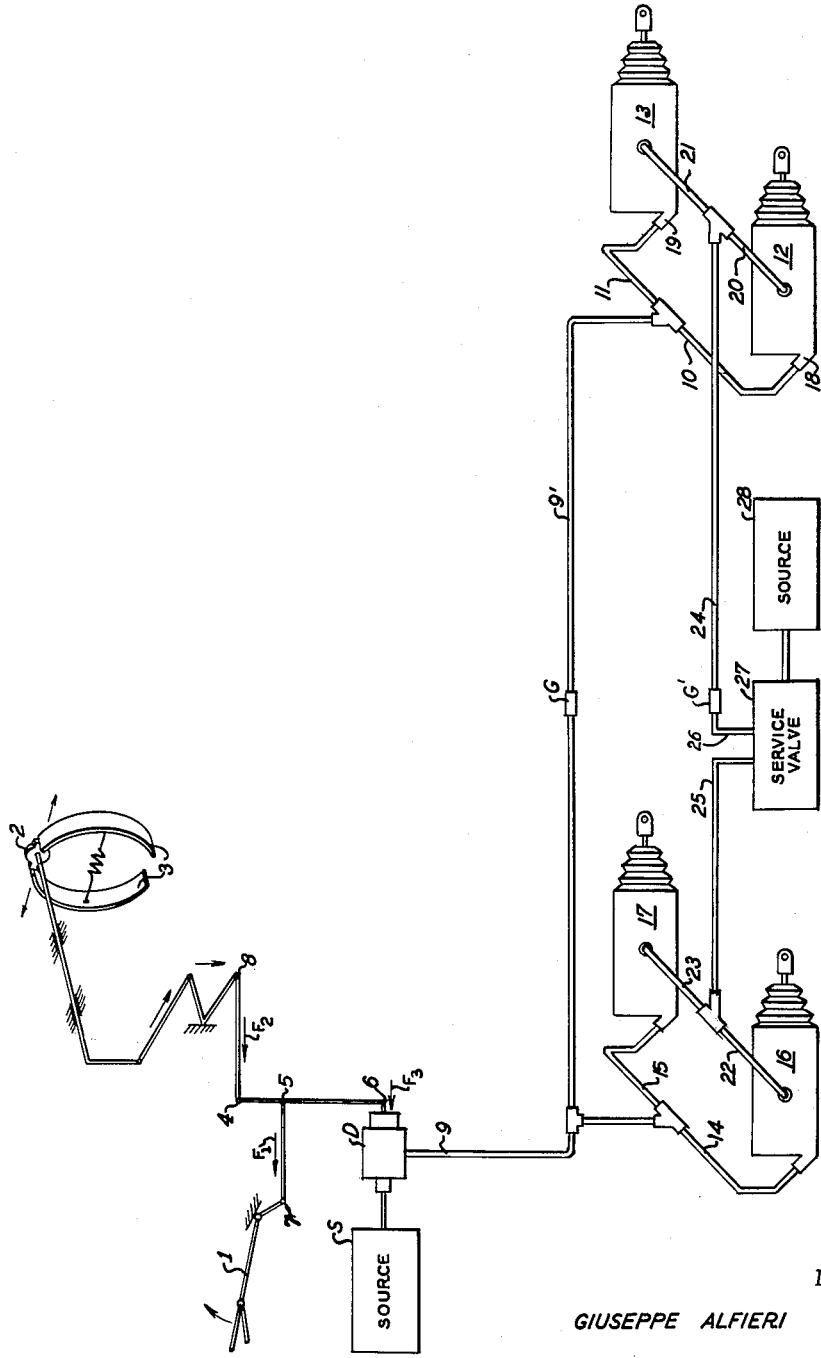
INVENTOR
GIUSEPPE ALFIERI nited States Patent Office 3,023,052
Patented Feb. 27, 1962

3,023,052
BRAKING EQUIPMENT FOR COMPOSITE VEHICLES
Giuseppe Alfieri, Milan, Italy, assignor to Fabbrica Italiana Magneti Marelli S.p.A., Milan, Italy, a company of Italy
Filed July 11, 1958, Ser. No. 747,951
Claims priority, application Italy July 11, 1957
2 Claims. (Cl. 303—2)

The invention relates to parking or emergency braking equipment for vehicles, and more particularly to equipment for tractor and trailer vehicles.

As is known, the action of the emergency brake is generally limited in trailer trucks and the like to the towing vehicle and is performed as a mechanical action on the wheels or on the driving shaft.

Braking action so effected is sufficient for single tractors or for composite vehicles with which the towed vehicle is kept to a limited weight as compared with the weight of the tractor. With the use of heavier trailers, however, the mechanical action of the emergency brake on the towing vehicle alone is insufficient especially in the case of steep slopes.

It is an object of the present invention to supplement, with an auxiliary pneumatic installation which is extremely simple and effective, the normal action of a parking or emergency brake by means of a supplemental braking action acting upon the towed vehicle and, if desired, also on the towing vehicle. The supplemental action is obtained concomitantly with the conventional action by actuating a hand brake alone. Since the mechanical braking of the tractor and the pneumatic braking of the towed and towing vehicles are thus performed simultaneously, the result is attained of braking uniformly the entire vehicle whatever the load conditions and the slope of the road may be.

The braking installation so improved is characterized in that with the conventional hand control of the parking or emergency brake there is conveniently associated or activated or de-activated thereby, a compressed-fluid distributor connected through a special coupling to the braking elements of the towed vehicle and directly to the braking elements of the towing vehicle.

Further characteristics of the invention will be described with reference to the accompanying drawing in which the sole figure represents by way of illustration without limitation a simplified diagram of a conventional mechanical braking device improved according to the invention.

With reference to the drawing, 1 indicates a lever of a hand brake, 2 a cam actuated by the lever system controlled by said lever 1 and acting upon brake shoes 3 of the tractor; 4—6 indicate a transmission introduced according to the invention, between conventional points 7 and 8 of a normal lever system for controlling the brakes of the tractor. In other words, between the points 7 and 8, in lieu of the single connecting link as provided in conventional systems, a new mechanical connection is substituted which comprises a first link (right-hand) with one end connected to the point 8 of the lever system and with the other one to the end 4 of the transmission 4—6 and a second link (left hand) with one end connected at a suitable point 5 of the transmission and with the other one at the point 7. The transmission 4—6 acts with the end 6 upon the distributor D fed during its active stage by the source S.

The distributor in turn is connected through a conduit 9, a coupling G and a conduit 9' to the conduits 10—11, the conduits constituting a pressure medium system for feeding the braking elements 12—13 of the towed vehicle (trailer or semitrailer).

There have also been indicated in the drawing the feeding conduits or pressure fluid system 14—15 of fluid braking elements 16—17 of the tractor or towing vehicle. Said conduits are connected to the conduit 9. In some cases it suffices to integrate the mechanical braking with a supplemental braking action on the towed vehicle only. It is then clear that the linking of the connections 14—15 will not be effected and there will not consequently be any further concomitant braking effect due to the activation of the elements 16—17 of the towing vehicle.

A conventional independent brake service system has also been illustrated in the drawing wherein a pressure supply 28 and service valve 27 are connected to the trailer brake cylinders 12 and 13 through conduit 26, coupling $G^1$ and conduits 24, 20, and 21. The pressure supply 28 and valve 27 are also connected to the tractor brakes 16 and 17 through conduits 25, 22 and 23.

Operation of the installation is as follows:

If one acts upon the lever 1 of the handbrake, one exerts upon the links 7—5 and 4—8 as well as upon the transmission 4—6 a stress tending to shift those members in the direction indicated by the arrows $f_1$, $f_2$, $f_3$.

The cam 2 consequently then activates the shoes 3 which in turn cause braking of the wheels on one axle (not shown) or of the transmission shaft of the towing vehicle or tractor.

At the same time as this mechanical braking action is exerted upon the towing vehicle, there takes place a pneumatic braking of the trailer and if necessary also upon the tractor. During the actuation of lever 1, the point 6 of the transmission activates the distributor D which is thereby able to feed the elements 12—13 and 16—17.

The braking action due to these elements lasts for the entire time during which the lever 1 remains actuated and, therefore, it is contemporaneous with the mechanical braking of the shoes 3 and supplements the same. It is obvious then that, at the time of unbraking, the lever 1 is brought back to its rest position and the stress acting upon the links ceases whereby the mechanical and pneumatic braking ceases. In particular, once the distributor D is inoperative, the connection is interrupted between the source S and the braking elements and the fluid, therefore, is no longer under pressure in the latter and can flow back through the feed conduits to discharge into a reservoir or the atmosphere.

It should be noted that the improvement of the braking equipment as illustrated is attained while utilizing substantially the same apparatus as already assembled on vehicles of the kind mentioned.

It has been found indeed that the leverage of the normal hand control remains substantially unvaried, there having been introduced only the transmission or lever system 4—6 in the conventional link 7—8.

The addition of the distributor D connected to the operating elements 12—13 and 16—17 does not involve any complication of the installation.

The use of the twin elements (12—13 and 16—17) as braking elements enables use on the trailer or on the tractor of the same braking elements as used in conventional equipment although the respective pneumatic circuits are distinct and independent.

Each twin element is provided in fact not only with the holes 18—19 (with reference to the elements 12—13) for the activation of the circuit in the stationing or emergency braking, but also with the feed conduits 20—21 for the pneumatic braking of the towed vehicle, which takes place during travel.

It should further be noted that the arrangement of the twin elements is such that the braking action as determined with the hand control and the normal braking action (actuation of the brake pedal) do not add thereby avoiding dangerous accidental excess of braking action if for any reason the driver comes to act contemporaneously upon the brake pedal and upon the lever of the hand brake.

What is claimed is:

1. In a vehicle including a tractor, a trailer towed by said tractor, fluid and mechanical brakes on said tractor, fluids brakes on said trailer, first and second pressure medium systems coupled to and adapted to control the fluid brakes on said tractor and trailer, and a hand control in said tractor for controlling the mechanical brakes on said tractor, said second pressure medium system including a distributor, said hand control being coupled to said distributor for controlling the supply and exhaust in said second pressure medium system concomitant with the operation of the mechanical brake.

2. A combination as claimed in claim 1 comprising a lever system including spaced links respectively coupled to said hand control and the mechanical brakes on said tractor and a further link pivoted to the first said links and operated by the same, said further link being operatively coupled to and controlling said distributor.

References Cited in the file of this patent

UNITED STATES PATENTS

| | | |
|---|---|---|
| 1,940,550 | Kazenmaier | Dec. 19, 1933 |
| 2,649,169 | Holman | Aug. 18, 1953 |